June 11, 1968 E. P. NORIS 3,387,362
COINED BAR METHOD OF FABRICATING COMMUTATORS
Filed June 3, 1966

INVENTOR.
EUGENE P. NORIS
BY
*Cameron Nickels*
ATTORNEY

United States Patent Office 3,387,362
Patented June 11, 1968

3,387,362
COINED BAR METHOD OF FABRICATING COMMUTATORS
Eugene P. Noris, Port-Au-Peck, N.J., assignor to The Bendix Corporation, Eatontown, N.J., a corporation of Delaware
Filed June 3, 1966, Ser. No. 555,151
3 Claims. (Cl. 29—597)

The present invention relates to dynamoelectric machines and more particularly to commutator bars used in such machines.

Present commutator bar manufacturing techniques use rolled or extruded strips of copper or copper alloys. To provide for a riser at one end of the bar for connections to the armature coils, it is necessary to make the bar high enough to allow removal of copper for the brush seat portion so that a riser remains higher than the brush seat portion. It is also necessary to mill between the risers in order that they be separated by a sufficient distance to avoid shorting. This not only wastes copper and insulating material, but adds cost for the material removal operation.

The present invention provides a coined or upset riser formed on the bar material which eliminates the removal of copper to form the riser. The bars may be coined at intervals and then assembled and compressed.

It is an object of the invention to provide an improved method of manufacturing commutator bars.

Another object of the invention is to provide an improved method of fabricating commutator bars that provides a savings in material.

The above and other objects and features of the invention will appear more fully hereinafter from a consideration of the following description taken in connection with the accompanying drawing wherein one example is illustrated by way of example.

Figure 1:
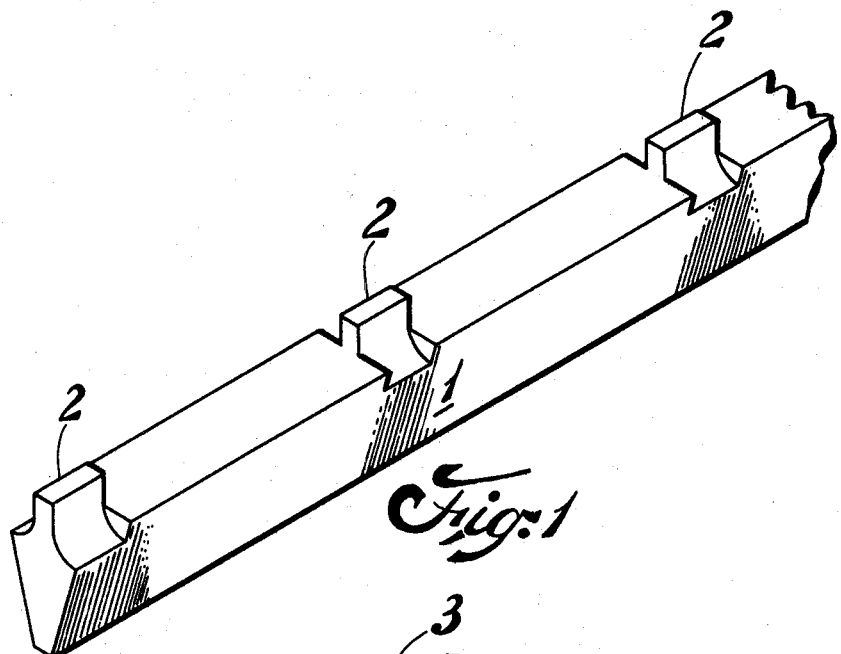
FIGURE 1 illustrates a commutator bar made in accordance with the invention.
Figure 2:
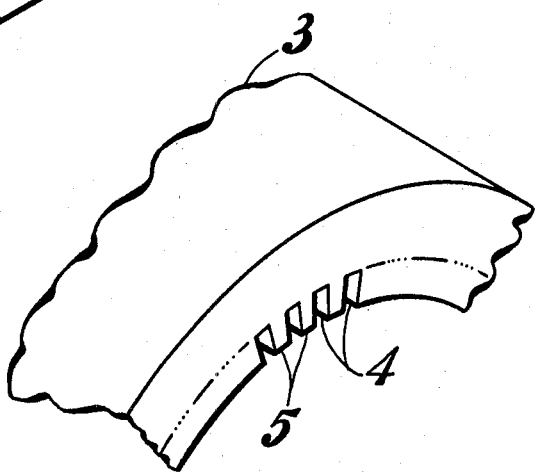
FIGURE 2 is a sectional view of a tool utilized in assemblying a commutator.

Referring now to the drawing, a commutator bar is indicated generally by the numeral 1 and may be of copper or a copper alloy. The bar 1 has risers 2 formed, by coining or swedging. After the risers 2 have been formed, the bars 1 are assembled with the conventional insulation between and placed in compression reducing ring 3. (FIGURE 2). The ring 3 has a plurality of slots 4 adapted to receive the risers 2. Teeth 5 formed by the slots 4 compress the bars between the risers.

After the assembled bars have been compressed the assembly is removed from the ring 3 and cut to form individual commutators. Also some machining is required to true up the commutators. It is understood that individual commutators could be processed in the same manner.

Although only one embodiment of the invention has been illustrated and described, various changes in the form and relative arrangement of the parts, which will now appear to those skilled in the art; may be made without departing from the scope of the invention.

What is claimed is:

1. A method of fabricating commutators comprising coining risers on a bar to extend higher than the top surface of the bar and having a width less than the bar, placing a plurality of said bars in a circular arrangement in a compression fixture having slots to receive the risers, compressing the bars together with insulation between the bars to form an assembly, removing the assembly from the fixture, cutting the assembly transversely of its axis to form individual commutators each having a riser at one end thereof, and machining to true up the commutator.

2. The method as set forth in claim 1 in which said bars are copper.

3. The method as set forth in claim 1 in which said bars are of a copper alloy.

References Cited

UNITED STATES PATENTS

| | | | |
|---|---|---|---|
| 840,451 | 1/1907 | Fuld | 310—235 |
| 1,457,801 | 6/1923 | Van Dusen | 29—597 X |
| 1,898,929 | 2/1933 | Apple | 310—235 |
| 2,956,191 | 10/1960 | Schafer | 310—235 |
| 3,224,076 | 12/1965 | Johnson et al. | 29—597 |

CHARLIE T. MOON, *Primary Examiner.*

C. E. HALL, *Assistant Examiner.*